US009062637B2

(12) United States Patent
Sager et al.

(10) Patent No.: US 9,062,637 B2
(45) Date of Patent: Jun. 23, 2015

(54) TURBOCHARGED ENGINE PURGE FLOW MONITOR DIAGNOSTIC

(71) Applicants: Roger C Sager, Munith, MI (US); Joshua P Macchiavello, Northville, MI (US); Paul J Gregor, Dexter, MI (US); Christopher G Hadre, LaSalle (CA); Thomas H Pruett, Westland, MI (US)

(72) Inventors: Roger C Sager, Munith, MI (US); Joshua P Macchiavello, Northville, MI (US); Paul J Gregor, Dexter, MI (US); Christopher G Hadre, LaSalle (CA); Thomas H Pruett, Westland, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/468,792

(22) Filed: Aug. 26, 2014

(65) Prior Publication Data

US 2014/0365071 A1  Dec. 11, 2014

Related U.S. Application Data

(62) Division of application No. 13/453,265, filed on Apr. 23, 2012, now Pat. No. 8,843,265.

(51) Int. Cl.
| | | |
|---|---|---|
| G01M 15/00 | (2006.01) | |
| F02M 25/08 | (2006.01) | |
| F02B 29/04 | (2006.01) | |
| G01M 15/09 | (2006.01) | |
| F02B 37/00 | (2006.01) | |

(52) U.S. Cl.
CPC ........ *F02M 25/0809* (2013.01); *F02B 29/0406* (2013.01); *F02B 37/00* (2013.01); *F02M 25/0836* (2013.01); *G01M 15/09* (2013.01); *Y02T 10/146* (2013.01)

(58) Field of Classification Search
CPC .............. G07C 5/0808; G07C 5/0816; B60W 50/0205; B60W 10/06; F02D 41/0047; F02M 25/0809; F02M 25/0836
See application file for complete search history.

(56) References Cited

U.S. PATENT DOCUMENTS

| | | | | |
|---|---|---|---|---|
| 5,230,319 A | * | 7/1993 | Otsuka et al. | 123/520 |
| 5,263,462 A | * | 11/1993 | Reddy | 123/520 |
| 5,347,971 A | | 9/1994 | Kobayashi et al. | |
| 6,247,458 B1 | | 6/2001 | Heinemann et al. | |
| 6,314,797 B1 | | 11/2001 | Dawson et al. | |
| 6,327,901 B1 | | 12/2001 | Dawson et al. | |
| 6,363,919 B1 | | 4/2002 | Isobe et al. | |
| 6,973,924 B1 | * | 12/2005 | Suzuki | 123/519 |
| 7,040,302 B2 | * | 5/2006 | Yamaguchi et al. | 123/520 |
| 7,131,322 B2 | * | 11/2006 | Booms et al. | 73/114.39 |

(Continued)

OTHER PUBLICATIONS

International Search Report dated Jun. 28, 2013 for International Application No. PCT/US2013/032795, International Filing Date Mar. 18, 2013.

(Continued)

*Primary Examiner* — James Trammell
*Assistant Examiner* — Demetra Smith-Stewart
(74) *Attorney, Agent, or Firm* — Ralph E Smith

(57) ABSTRACT

A method is provided for testing the evaporative emission system of a vehicle having a forced induction engine. The method includes controlling a vacuum bypass valve and a purge flow control valve to create the necessary conditions to perform the testing of the evaporative emission system. The method determines whether an evaporative system integrity monitor switch is open after a timer is initiated and the vacuum bypass valve is opened.

11 Claims, 5 Drawing Sheets

(56) References Cited

U.S. PATENT DOCUMENTS

| | | | |
|---|---|---|---|
| 7,159,580 B2* | 1/2007 | Shikama et al. | 123/520 |
| 7,562,530 B2* | 7/2009 | Kolmanovsky | 60/612 |
| 8,327,691 B2* | 12/2012 | Drane et al. | 73/49.7 |
| 2001/0022173 A1* | 9/2001 | Fabre | 123/519 |
| 2002/0116102 A1* | 8/2002 | Kaiser et al. | 701/29 |
| 2003/0196645 A1* | 10/2003 | Kojima et al. | 123/520 |
| 2004/0030487 A1* | 2/2004 | Streib | 701/114 |
| 2004/0231404 A1* | 11/2004 | Yamaguchi et al. | 73/118.1 |
| 2006/0225491 A1* | 10/2006 | Booms et al. | 73/118.1 |
| 2006/0229796 A1* | 10/2006 | Booms et al. | 701/114 |
| 2006/0249126 A1 | 11/2006 | Hurley | |
| 2009/0266147 A1 | 10/2009 | Maegawa | |
| 2010/0064774 A1* | 3/2010 | Drane et al. | 73/40 |
| 2010/0078001 A1* | 4/2010 | Kolmanovsky et al. | 123/676 |
| 2010/0224171 A1 | 9/2010 | Peters et al. | |
| 2013/0220282 A1 | 8/2013 | Hadre et al. | |

OTHER PUBLICATIONS

Written Opinion dated Jun. 28, 2013 for International Application No. PCT/US2013/032795, International Filing Date Mar. 18, 2013.

* cited by examiner

TURBOCHARGED ENGINE PURGE FLOW MONITOR DIAGNOSTIC

CROSS REFERENCE TO RELATED APPLICATION

This application is a divisional of U.S. Ser. No. 13/453,265, filed Apr. 23, 2014

FIELD

The present disclosure relates to an engine purge flow monitor diagnostic for a turbocharged engine, and, more particularly, to an engine purge flow monitor diagnostic for a turbocharged engine using a vacuum bypass valve and a purge flow control valve.

BACKGROUND

Modern internal combustion engines are typically fed fuel from a fuel tank system. The fuel tank system usually includes an evaporative emission control system ("EVAP system") that collects fuel vapors generated by fuel in the fuel tank system. These fuel vapors, among other things, pose an environmental and safety hazard. A typical EVAP system includes a canister connected to the fuel tank that collects and stores fuel vapors emitted from the fuel tank. A purge valve is usually located between an intake manifold of the engine and the canister. It is desirable to check the EVAP system to ensure that it does not contain any leaks. An electronic controller controls the components of the typical EVAP system to determine whether a leak is present. A typical test method, as disclosed in U.S. Pat. No. 6,314,797, creates a vacuum in the EVAP system and monitors the system pressure to determine whether a leak is occurring.

Many engines in modern automobiles are fed compressed air by a turbocharger, supercharger, or some other device. These forced induction engines usually include vacuum ejector tee hardware in the EVAP system. The vacuum ejector tee typically includes integrated check valves to prevent the backflow of air from the forced induction engine into the evaporative system. However, the addition of the vacuum ejector tee prevents the proper vacuum from forming in the fuel tank system for the EVAP system test.

What is needed, therefore, is a method for testing the EVAP system in a forced induction engine.

SUMMARY

In one form, the present disclosure provides a diagnostic method for an evaporative emission control system for a vehicle having an engine including a fuel tank pressure sensor, a purge flow control valve, and a vacuum bypass valve. The method includes closing the purge flow control valve, opening the vacuum bypass valve, and initiating a timer. The method also includes determining whether the pressure sensed by the fuel tank pressure sensor is stabilized. If the pressure sensed by the fuel tank pressure sensor is stabilized, the method includes closing the vacuum bypass valve and recording an initial reading from the fuel tank pressure sensor, opening the purge flow control valve a predetermined amount, and determining whether the timer has expired. If the timer has not expired, the method includes determining whether the pressure sensed by the fuel tank pressure sensor is greater than or equal to the initial reading from the fuel tank pressure sensor. If the pressure sensed by the fuel tank pressure sensor is greater than or equal to the initial reading from the fuel tank pressure sensor, the method includes closing the purge flow control valve and completing the test method successfully.

In another form, the present disclosure provides a diagnostic method for an evaporative emission control system for a forced induction vehicle having a vacuum bypass valve and an evaporative system integrity monitor including an evaporative system integrity monitor switch. The method includes initiating a timer, opening the vacuum bypass valve, and determining whether the evaporative system integrity monitor switch is open. If the evaporative system integrity monitor switch is open, the method includes closing the vacuum bypass valve and successfully completing the method.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
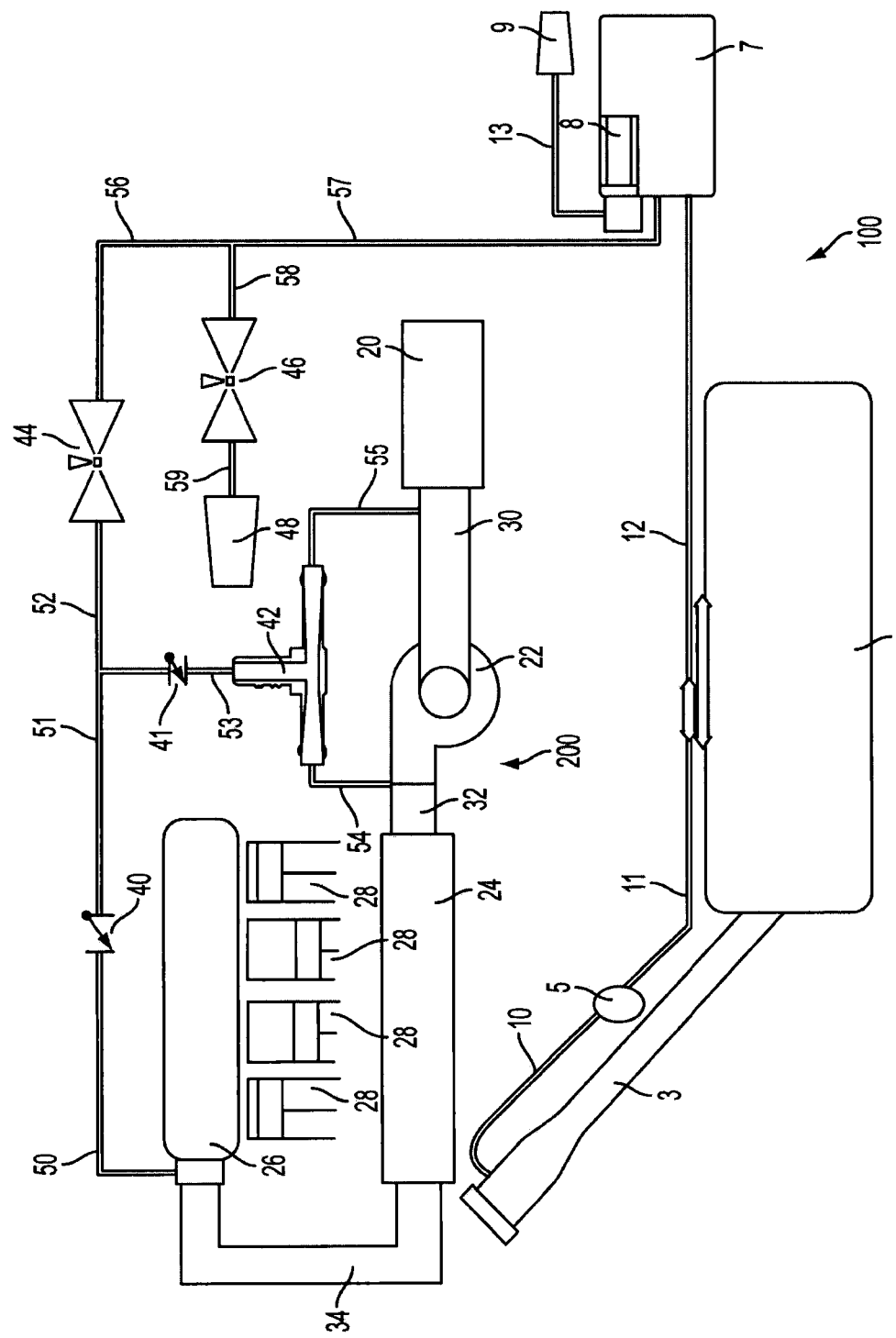
FIG. 1 is a diagram of an engine fitted with an exemplary EVAP system according to the principles of the present disclosure.

FIG. 1 illustrates an engine fitted with an exemplary EVAP system 100 according to the principles of the present disclosure. An engine intake system 200 includes an airbox 20 connected by piping 30 to an air intake of a turbocharger 22. An air output of the turbocharger 22 is connected by piping 32 to an inlet of a charge air cooler 24 that cools the air exiting the turbocharger 22. An outlet of the charge air cooler 24 is connected by piping 34 to the inlet of an intake manifold 26 of the internal combustion engine. The intake manifold 26 is coupled to at least one engine cylinder 28.

The exemplary EVAP system 100 includes a fuel tank 1 having a fuel fill tube 3, which is removably sealed on an end opposite the fuel tank 1. The fuel fill tube 3 is connected by a vacuum hose 10 to a fuel tank pressure sensor 5. The fuel tank pressure sensor 5 is connected by vacuum hose 11 to the fuel tank 1.

The fuel tank 1 is also connected by vacuum hose 12 to a canister 7. In one embodiment, the canister 7 collects and stores fuel vapors emitted from the fuel tank 1. The canister 7 includes an evaporative system integrity monitor 8 ("ESIM"). The ESIM 8 is coupled to an air filter 9 by vacuum hose 13 to allow the ESIM 8 to adjust the air pressure within the EVAP system 100 as necessary. The ESIM 8 includes a passive mechanical switch that permits air to flow between the canister 7 and atmosphere through vacuum hose 13 and the filter 9.

The canister 7 is also connected by vacuum hose 57 to vacuum hose 58 connected to a first side of a vacuum bypass valve 46. A second side of the vacuum bypass valve 46 is coupled by vacuum hose 59 to an air filter 48. The vacuum bypass valve 46 may be selectively opened or closed by an electronic controller to allow air pressure within the EVAP system 100 to be adjusted in relation to atmospheric pressure through the air filter 48. The vacuum hose 57 connected to the canister 7 is also connected to vacuum hose 56 connected to a first side of a purge flow control valve 44. A second side of the purge flow control valve 44 is connected to vacuum hose 52. The purge flow control valve 44 may be selectively opened or closed by the electronic controller to permit air within the EVAP system 100 to flow through the purge flow control valve 44.

Vacuum hose 52 is connected to a one-way check valve 41, which is coupled by vacuum hose 53 to a first port of a vacuum ejector tee 42. The one-way check valve 41 permits the flow of air in a single direction. In the EVAP system 100 of FIG. 1, air is permitted to flow through the one-way check valve 41 towards the vacuum ejector tee 42. Air is not permitted to flow through the one-way check valve 41 in a direction away from the vacuum ejector tee 42. A second port of the vacuum ejector tee 42, perpendicular to the first port, is connected to a vacuum hose 55 connected to piping 30 of the engine intake system 200. A third port of the vacuum ejector tee 42, perpendicular to the first port and opposite the second port, is connected to a vacuum hose 54 connected to piping 32 of the engine intake system 200. When the turbocharger 22 generates positive pressure in the engine intake system 200, pressurized air flows from piping 32 through vacuum hose 54 and through the second and third ports of the vacuum ejector tee 42. The flow of air through the second and third ports of the vacuum ejector tee 42 creates a vacuum on the first port of the vacuum ejector tee 42 and causes air to be pulled out of the EVAP system 100 through the one-way check valve 41 and into the first port of the vacuum ejector tee 42. The air flow from the first and third ports of the vacuum ejector tee 42 exits the second port of the vacuum ejector tee 42 and is returned to the engine intake system 200 through vacuum hose 55 and piping 30.

Vacuum hose 52 is also connected by vacuum hose 51 to a second one-way check valve 40. The one-way check valve 40 is connected by vacuum hose 50 to the intake manifold 26 of the engine intake system 200. The one-way check valve 40 permits the flow of air in a single direction. In the EVAP system 100 of FIG. 1, air is permitted to flow through the one-way check valve 40 towards the intake manifold 26. Air is not permitted to flow through the one-way check valve 40 in a direction away from the intake manifold 26. When the turbocharger 22 is not generating positive air pressure, the intake manifold 26 is operating under vacuum. Thus, air from the EVAP system 100 is drawn through the one-way check valve 40 towards the intake manifold 26 creating vacuum in the EVAP system 100. The one-way check valve 40 is closed when the turbocharger 22 is generating positive air pressure.

The electronic controller (not shown) is in electronic communication with the fuel tank pressure sensor 5, ESIM 8, purge flow control valve 44, and vacuum bypass valve 46. The electronic controller monitors the pressure in the EVAP system 100 through the fuel tank pressure sensor 5. In addition, the electronic control monitors the status of the ESIM 8 switch to determine whether it is opened or closed. The electronic controller also controls the opening and closing of the purge flow control valve 44 and vacuum bypass valve 46.

Figure 2:
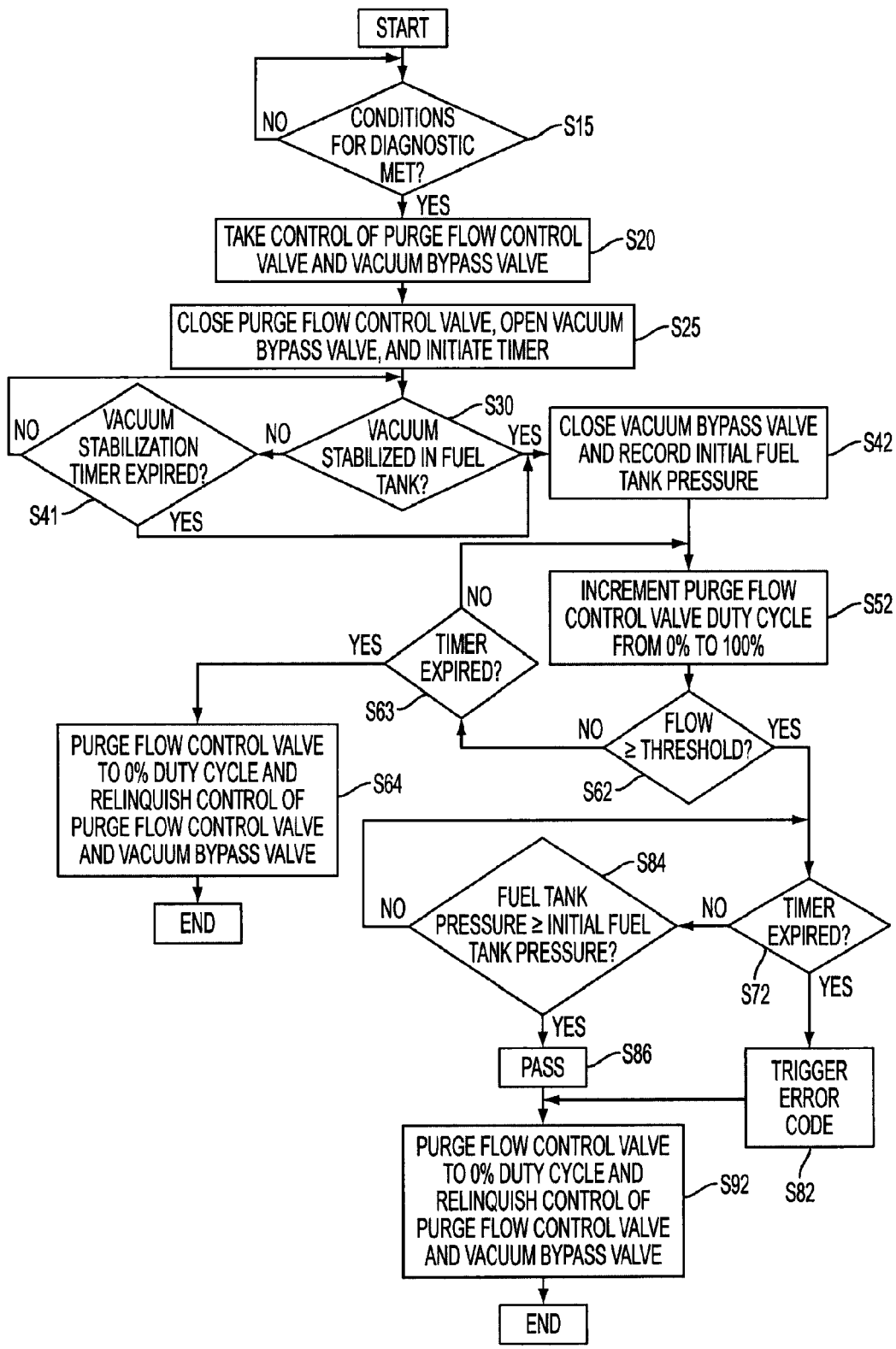
FIG. 2 is a flowchart for a first EVAP system pressure test of the EVAP system of FIG. 1.

FIG. 2 is a flowchart for a first EVAP system 100 pressure test of the EVAP system 100 of FIG. 1. The flowchart of FIG. 2 depicts the test method for an EVAP system 100 turbo purge flow monitor test. The test is initiated. At S15, the electronic controller determines whether the conditions for the EVAP system 100 turbo purge flow monitor test are satisfied. In one embodiment, the conditions are satisfied if (1) the turbocharger 22 is generating positive pressure in the engine intake system 200; (2) the engine has achieved normal operating temperature; (3) the engine is operating in a closed loop fuel control; (4) the ambient atmospheric pressure is between 74.5 and 110 kPa; and (5) the ambient temperature is between 40° F. and 90° F. In one embodiment, any combination and number of the above conditions or additional conditions may be tested. Moreover, the pressure and temperature ranges are for exemplary purposes only. Any pressure or temperature range may be employed. The test may be stopped or held at S15 until the conditions for the test are satisfied.

In the event the conditions at S15 are satisfied, the electronic controller takes control of the purge flow control valve 44 and vacuum bypass valve 46 at S20 from the normal operating electronics of the vehicle. Because the turbocharger 22 is generating positive pressure (S15), the purge flow control valve 44 is already closed. At S25, the electronic controller opens the vacuum bypass valve 46 and initiates a timer and a vacuum stabilization timer. The timer measures the time from the start of S25 to a subsequent step in the method. Likewise, the vacuum stabilization timer measures the time from the start of S25 to a subsequent step in the method. In one embodiment, the timer and vacuum stabilization timer may be the same timer but may measure the time to different events and expire at the same or different times. In one embodiment, the timer and vacuum stabilization timer may be different timers.

At S30, the electronic controller monitors the fuel tank pressure sensor 5 to determine whether air pressure has stabilized within the fuel tank 1. In the event air pressure has not stabilized in the fuel tank 1, the electronic controller determines whether the vacuum stabilization timer has expired at S41. In one embodiment, the vacuum stabilization timer expires 30 seconds after being activated at S25. In one embodiment, the vacuum stabilization timer may expire sooner than or later than 30 seconds.

In the event the vacuum stabilization timer has not expired (S41), the electronic controller continues to determine whether the air pressure has stabilized within the fuel tank 1 (S30). In the event the vacuum stabilization timer has expired (S41), the electronic controller closes the vacuum bypass valve 46 and records the pressure measured by the fuel tank pressure sensor 5 (S42).

In the event the air pressure has stabilized within the fuel tank 1 (S30) before the vacuum stabilization timer expires (S41), the electronic controller closes the vacuum bypass valve 46 and records the pressure measured by the fuel tank pressure sensor 5 (S42). The electronic controller than increments the opening of the purge flow control valve 44 from 0% to 100% with 0% representing a fully closed purge flow control valve 44 and 100% representing a fully open purge flow control valve 44 (S52). The opening of the purge flow control valve 44 is performed in steps; after each stepped opening, the electronic controller determines whether the flow through the purge flow control valve 44 exceeds a threshold amount (S62). If the threshold amount is not exceeded (S62), the electronic controller determines whether the timer has expired (S63). In one embodiment, the timer expires 90 seconds after being activated at S25. In one embodiment, the timer may expire sooner than or later than 90 seconds. If the timer has not expired (S63), the method repeats starting at S52. In the event the timer has expired (S63), the EVAP system 100 has failed the test method. In one embodiment, an error code may be triggered to alert the vehicle operator of the failure. The electronic controller then returns the purge flow control valve 44 to 0% (i.e., closes the purge flow control valve 44) and relinquishes control of the purge flow control valve 44 and vacuum bypass valve 46 (S64) to the normal operating electronics of the vehicle. The method then ends.

In the event the flow through the purge flow control valve 44 exceeds the threshold amount (S62), the method moves on to the next step (S72). In one embodiment, the threshold amount may be the minimum amount of flow through the purge flow control valve 44 necessary to successfully perform the test method. The threshold amount may vary depending upon the geometry of the EVAP system 100. However, even if the method moves on to the next step, the purge flow control valve 44 continues to be stepped open until it is 100% open. In one embodiment, the purge flow control valve 44 may be opened in increments of 0%, 20%, 50%, 70%, and 100%. In one embodiment, any number and size of increments may be used.

Once the flow through the purge flow control valve 44 exceeds the threshold value (S62), the controller determines whether the timer has expired (S72). In the event the timer has expired (S72), the EVAP system 100 has failed the test method and an error code is triggered to alert the vehicle operator of the failure (S82). The electronic controller then returns the purge flow control valve 44 to 0% (i.e., closes the purge flow control valve 44) and relinquishes control of the purge flow control valve 44 and vacuum bypass valve 46 (S92) to the normal operating electronics of the vehicle. The method is completed unsuccessfully.

In the event the timer has not expired (S72), the electronic controller determines whether the pressure reported by the fuel tank pressure sensor 5 is greater than or equal to the initial pressure reported by the fuel tank pressure sensor 5 at S42 (S84). Because the fuel tank is under vacuum, the initial pressure reported by the fuel tank pressure sensor 5 and the pressure reported by the fuel tank pressure sensor 5 are negative pressures. Thus, for the purposes of the present method, a greater pressure will indicate a pressure that is less negative. The EVAP system 100 successfully passes the turbo purge flow monitor test if the pressure reported by the fuel tank pressure sensor 5 is greater than or equal to the initial pressure reported by the fuel tank pressure sensor 5 at S42 (S86). The electronic controller then returns the purge flow control valve 44 to 0% (i.e., closes the purge flow control valve 44) and relinquishes control of the purge flow control valve 44 and vacuum bypass valve 46 (S92) to the normal operating electronics of the vehicle. The test method is completed successfully. If the pressure reported by the fuel tank pressure sensor 5 is not greater than or equal to the initial pressure reported by the fuel tank pressure sensor 5 at S42 (S84), the electronic controller repeats the method starting at S72.

Figure 3:
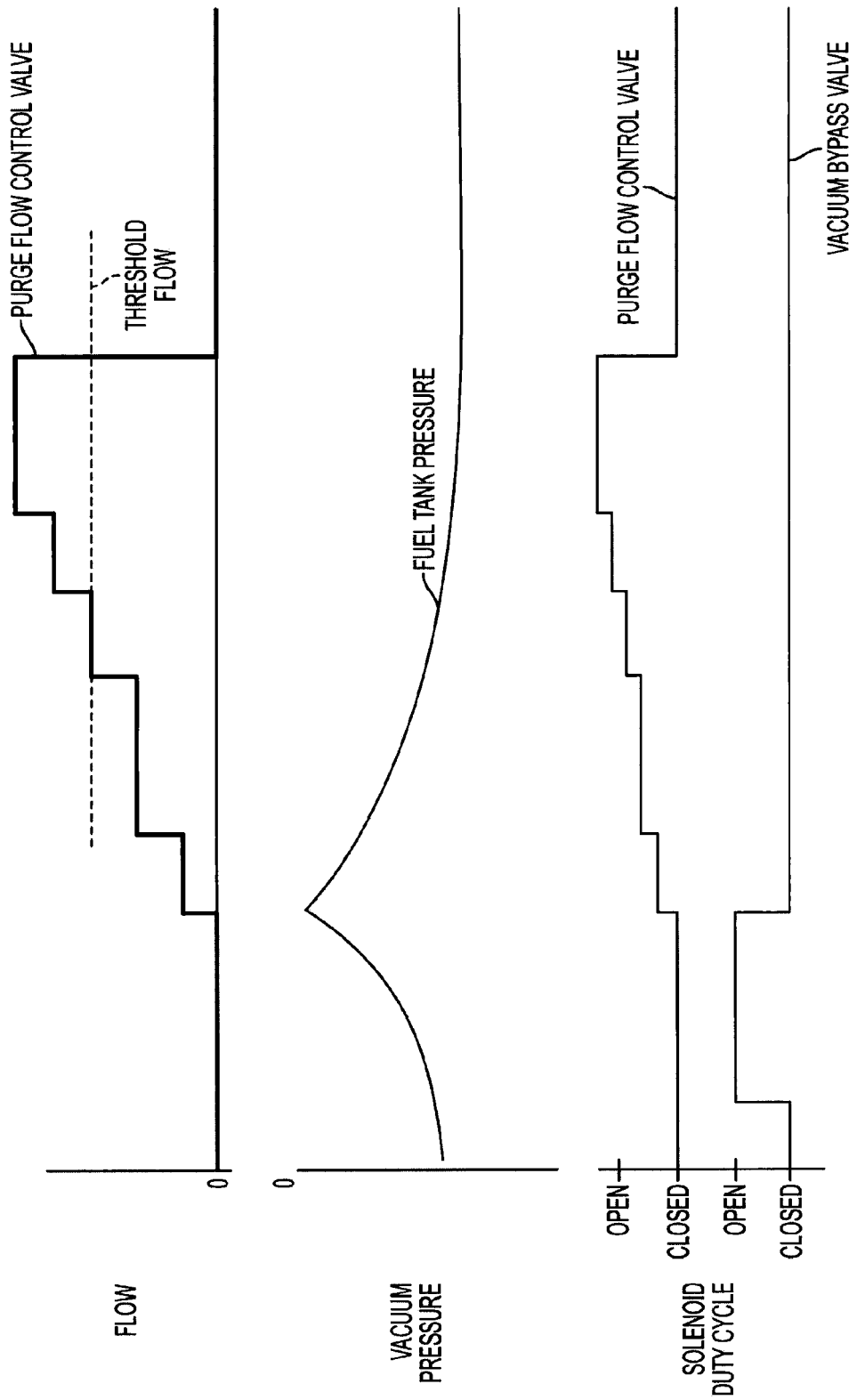
FIG. 3 is a graph of flow, pressure, and solenoid duty cycle during the first EVAP system test.

FIG. 3 is a graph of flow, pressure, and solenoid duty cycle during the first EVAP system 100 test of FIG. 2. FIG. 3 depicts an EVAP system 100 test in which the vacuum pressure in the fuel tank 1 is stabilized at S30. The uppermost plot depicts the flow through the purge flow control valve 44 during the test method of FIG. 2. Initially, the purge flow control valve 44 is closed. At S52, the purge flow control valve 44 is incrementally opened from 0% open to 100% open. The uppermost plot shows a corresponding increase in air flow through the purge flow control valve 44 with each incremental opening. In the example of FIG. 3, the threshold flow level is reached at the third incremental opening of the purge flow control valve 44. At S92 the purge flow control valve 44 is closed and the air flow through the purge flow control valve 44 is stopped.

The middle plot of FIG. 3 depicts the air pressure in the fuel tank 1 as determined by the fuel tank pressure sensor 5 during the test method of FIG. 2. At S25, the vacuum bypass valve 46 is opened allowing the vacuum in the EVAP system 100 and fuel tank 1 to decrease towards zero. The air pressure in the fuel tank 1 peaks close to zero at S42 as the vacuum bypass valve 46 is closed. This approximately coincides with the opening of the purge flow control valve 44 and the start of air flow through the purge flow control valve 44. The air pressure in the fuel tank 1 immediately begins to decrease to a higher vacuum level as the purge flow control valve 44 is incrementally opened at S52. The fuel tank 1 air pressure levels out as the test method completes.

The lowermost plot of FIG. 3 depicts the duty cycle of the solenoids that control the purge flow control valve 44 and the vacuum bypass valve 46 during the test method of FIG. 2. The vacuum bypass valve 46 is opened first and remains open until the purge flow control valve 44 is opened. The vacuum bypass valve 46 is closed slightly before the purge flow control valve 44 is opened. The timing of the closing of the vacuum bypass valve 46 and the opening of the purge flow control valve 44 approximately coincides with the lowest vacuum air pressure achieved in the fuel tank 1. The purge flow control valve 44 is incrementally opened at S52. The incremental opening (S52) of the purge flow control valve 44 corresponds to the incremental increases in the air flow through the purge flow control valve 44 depicted in the uppermost plot of FIG. 3.

Figure 4:
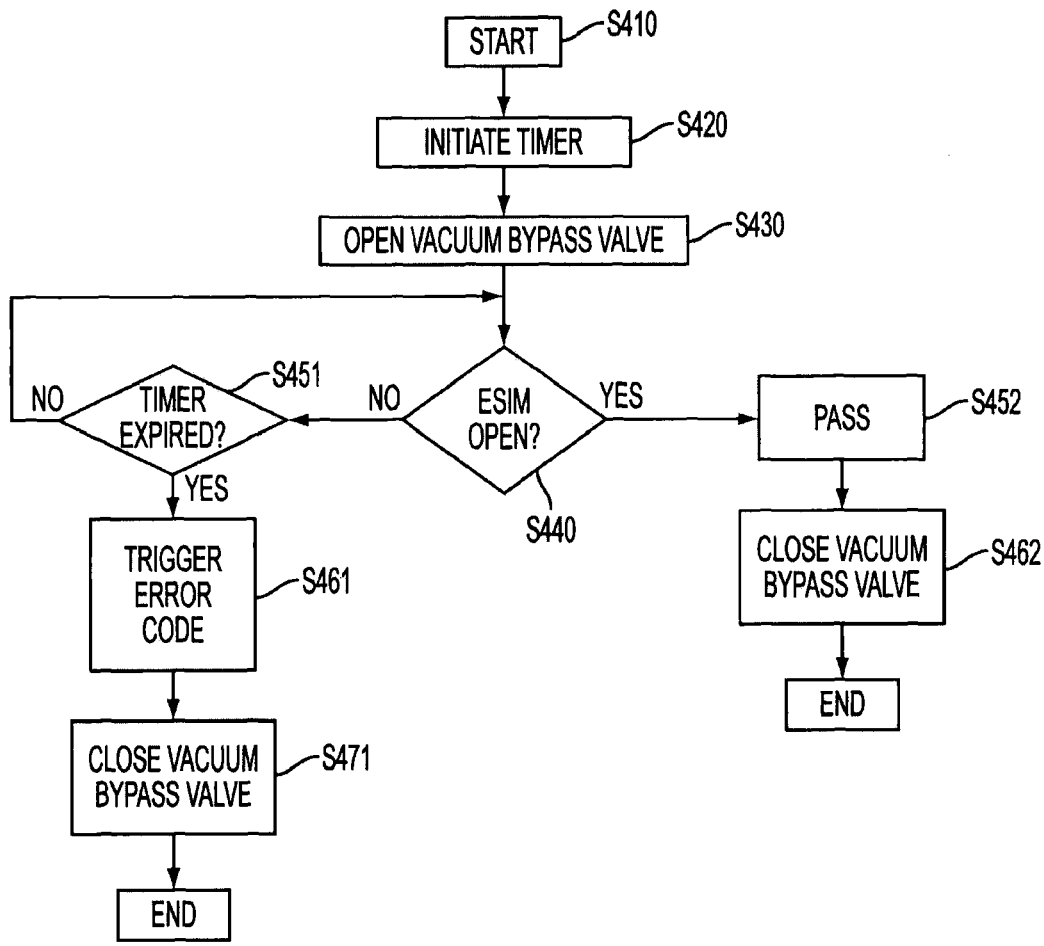
FIG. 4 is a flowchart for a second EVAP system pressure test of the EVAP system of FIG. 1.

FIG. 4 is a flowchart for a second EVAP system 100 pressure test of the EVAP system 100 of FIG. 1. The flowchart of FIG. 4 depicts the test method for an EVAP system 100 ESIM 8 functionality test. Specifically, the method of FIG. 4 depicts an ESIM 8 switch stuck closed test. The test method of FIG. 4 is performed after the engine has been turned off. The test is initiated. At S420, the electronic controller initiates a timer. The timer measures the time from the start of S420 to a subsequent step in the method. The electronic controller next opens the vacuum bypass valve 46 (S430). At S440, the electronic controller determines whether the ESIM 8 switch is open. In the event the ESIM 8 switch is open, the EVAP system 100 passes the test method (S452). The electronic controller subsequently closes the vacuum bypass valve 46 (S462) and the test method is completed successfully.

In the event the ESIM 8 switch is not open at S440, the electronic controller determines whether the timer has expired (S451). In one embodiment, the timer expires 90 seconds after being activated at S420. If the timer has not expired (S451), the method is repeated starting at S440. If the timer has expired (S451), the EVAP system 100 fails the test and an error code is triggered to alert the vehicle operator to the failure (S461). The electronic controller subsequently closes the vacuum bypass valve 46 (S471) and the test method is completed unsuccessfully.

Figure 5:
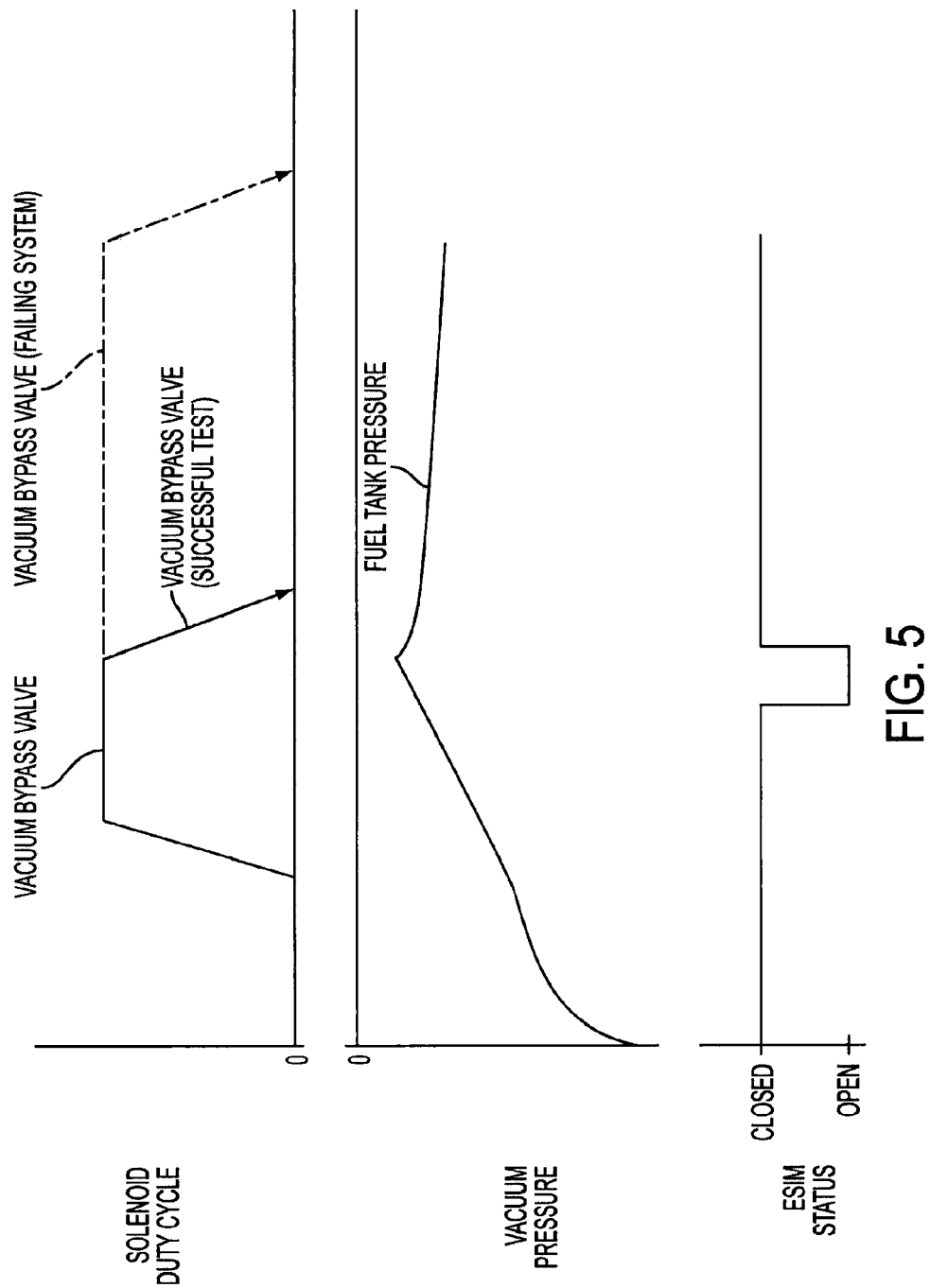
FIG. 5 is a graph of solenoid duty cycle, pressure, and ESIM status during the second EVAP system test.

FIG. 5 is a graph of solenoid duty cycle, pressure, and ESIM 8 status during the second EVAP system 100 test of FIG. 4. The uppermost plot depicts the solenoid duty cycle of the vacuum bypass valve 46 during the test method of FIG. 4. Initially, the vacuum bypass valve 46 is closed. At S430, the vacuum bypass valve 46 is opened from 0% to 100% open. The solid line represents a successful test of the ESIM 8 switch. The dashed line represents an unsuccessful test of the ESIM 8 switch. In the successful test, the vacuum bypass valve 46 closes (S462) shortly after the ESIM 8 switch opens (S440). The ESIM 8 switch for a successful EVAP system 100 test is depicted opening in the lowermost plot of FIG. 5. In the unsuccessful test, represented by the dashed line, the ESIM 8 switch does not open at all. Instead, the vacuum bypass valve 46 is closed (S471) after the timer expires (S451).

The middle plot of FIG. 5 depicts the air pressure in the fuel tank 1 as determined by the fuel tank pressure sensor 5 during the test method of FIG. 4 that is successfully completed. At S430, the vacuum bypass valve 46 is opened allowing the vacuum in the fuel tank 1 to decrease towards zero. The air pressure in the fuel tank 1 peaks close to zero at S440 as the ESIM 8 switch opens. The vacuum bypass valve 46 is closed (S462) and the test method is successfully completed.

The lowermost plot of FIG. 5 depicts the status of the ESIM 8 switch. The ESIM 8 switch opens approximately as the pressure in the fuel tank 1 peaks close to zero. The ESIM 8 switch then closes a short time later as the vacuum pressure in the fuel tank 1 increases to a higher vacuum level.

It should be understood that the embodiment depicted in FIG. 1 is for representative purposes only. The method may be used in an EVAP system 100 having an engine intake system 200 having any desired arrangement. In one embodiment, any number or arrangement of the engine cylinders 28, intake manifolds 26, piping 30, 32, 34, air filter 20, turbocharger 22, and charge air cooler 24 may be used. In one embodiment, the turbocharger 22 may be replaced by a supercharger or any other forced induction device. In addition, any arrangement of an EVAP system 100 having at least one purge flow control valve 44 and vacuum bypass valve 46 may be used.

Thus, a method for testing the EVAP system in a turbocharged engine is provided. The method is capable of providing the necessary conditions for performing a turbo purge flow monitor test of the EVAP system. The method is also capable of providing the necessary conditions for testing the functionality of the ESIM switch.

What is claimed is:

1. A diagnostic method for an integrity monitor switch of an evaporative emission control system for a fuel system in a vehicle powered by a forced induction engine, the vehicle including a vacuum bypass valve and at least one check valve preventing airflow from the engine back to the fuel system, the diagnostic method comprising:
   in response to the forced induction engine turning off, initiating a timer and commanding, by a controller of the vehicle, the vacuum bypass valve to open;
   in response to commanding the vacuum bypass valve to open, determining whether the integrity monitor switch is open;
   when the integrity monitor switch is open, commanding, by the controller, the vacuum bypass to close; and
   when (i) the timer has expired and (ii) the integrity monitor switch is not open, detecting a malfunction of the integrity monitor switch.

2. The diagnostic method of claim 1, further comprising, when the integrity monitor switch is not open:
   determining whether the timer has expired,
   when the timer has not expired, determining again whether the integrity monitor switch is open, and
   when the timer has expired, commanding the vacuum bypass valve to close and detecting a malfunction of the integrity monitor switch.

3. The diagnostic method of claim 2, further comprising triggering an error code indicative of the malfunction of the integrity monitor switch.

4. The diagnostic method of claim 2, further comprising determining whether at least one predetermined condition is satisfied prior to initiating the timer and not initiating the timer until the at least one predetermined condition is satisfied.

5. The diagnostic method of claim 2, further comprising (i) determining whether at least one predetermined condition is satisfied prior to initiating the timer and (ii) not initiating the timer until the at least one predetermined condition is satisfied.

6. A system of a vehicle including an evaporative emission control system and a forced induction engine, the system comprising:
   at least one check valve coupled to a vacuum line and configured to prevent airflow from an intake manifold of the forced induction engine back to a fuel vapor canister of the evaporative emission control system via the vacuum line;
   a purge flow control valve coupled to the vacuum line between the at least one check valve and the fuel vapor canister and configured to control airflow from the fuel vapor canister via the vacuum line;
   an integrity monitor switch configured to open/close based on a pressure in the fuel vapor canister;
   a vacuum bypass valve coupled to the vacuum line between the purge flow control valve and the fuel vapor canister and configured to be commanded open/closed to selectively connect the vacuum line to an atmosphere; and
   a controller configured to detect when the forced induction engine is turned off and, in response to detecting that the forced induction engine is off:
      initiate a timer and command the vacuum bypass valve to open;
      in response to the commanding the vacuum bypass valve to open, detecting whether the integrity monitor switch is open; and
      based on whether (i) the timer has expired and (ii) the integrity monitor switch is open, detecting a malfunction of the integrity monitor switch.

7. The system of claim 6, wherein the controller is configured to detect the malfunction of the integrity monitor switch when (i) the timer has expired and (ii) the integrity monitor switch is closed.

8. The system of claim 7, wherein the controller is further configured to command the vacuum bypass valve closed in response to the timer expiring.

9. The system of claim 6, wherein the controller is configured to validate operation of the integrity monitor switch when the integrity monitor switch is open before or when the timer expires.

10. The system of claim 6, wherein the timer has a duration corresponding to a high degree of likelihood that a non-malfunctioning integrity monitor switch will open before the timer expires.

11. The system of claim 6, wherein the forced induction engine is a turbocharged engine comprising at least one turbocharger and a vacuum ejector tee system having the at least one check valve integrated therewith.

* * * * *